(12) United States Patent
Satou et al.

(10) Patent No.: US 11,301,135 B2
(45) Date of Patent: Apr. 12, 2022

(54) DATA MANAGEMENT DEVICE, DATA MANAGEMENT PROGRAM, AND DATA MANAGEMENT METHOD

(71) Applicant: FANUC Corporation, Yamanashi (JP)

(72) Inventors: Kazuhiro Satou, Yamanashi (JP); Kazunori Iijima, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/504,333

(22) Filed: Jul. 8, 2019

(65) Prior Publication Data
US 2020/0026435 A1 Jan. 23, 2020

(30) Foreign Application Priority Data
Jul. 23, 2018 (JP) .............................. JP2018-137748

(51) Int. Cl.
*G06F 3/06* (2006.01)
*G06F 3/14* (2006.01)

(52) U.S. Cl.
CPC .......... *G06F 3/0608* (2013.01); *G06F 3/0652* (2013.01); *G06F 3/0673* (2013.01); *G06F 3/14* (2013.01)

(58) Field of Classification Search
CPC .... G06F 3/0608; G06F 3/0652; G06F 3/0673; G06F 3/14; G06F 12/00; G06F 13/00
See application file for complete search history.

(56) References Cited

U.S. PATENT DOCUMENTS

| | | | | |
|---|---|---|---|---|
| 5,857,073 A | * | 1/1999 | Tsukamoto | .......... G06Q 10/107 709/208 |
| 2016/0098176 A1 | * | 4/2016 | Cervelli | .............. G06F 3/04845 715/804 |
| 2016/0105338 A1 | * | 4/2016 | Fletcher | ........... G06Q 10/06393 709/224 |
| 2020/0043254 A1 | * | 2/2020 | Hase | .................... G07C 5/0808 |

FOREIGN PATENT DOCUMENTS

| | | |
|---|---|---|
| EP | 3309682 A1 | 4/2018 |
| JP | 200915789 A | 1/2009 |
| JP | 2015212677 A | 11/2015 |
| JP | 2017-173321 A | 9/2017 |
| JP | 2018106421 A | 7/2018 |
| WO | 2016/199210 A1 | 12/2016 |

* cited by examiner

*Primary Examiner* — Tuan V Thai
(74) *Attorney, Agent, or Firm* — Hauptman Ham, LLP

(57) ABSTRACT

The data management device capable of calculating an evaluation index based on the sensor data includes: a sensor data acquisition unit that acquires the sensor data from one or more sensors installed in an industrial machine; an evaluation index calculation unit that calculates the evaluation index with use of the sensor data; a sensor data storage unit that saves the sensor data; and a sensor data deletion unit that deletes the sensor data when a total volume of the sensor data in the sensor data storage unit exceeds an upper limit. The sensor data deletion unit determines saving priority of the sensor data based on a degree of change in the evaluation index and deletes the sensor data in accordance with the saving priority.

6 Claims, 5 Drawing Sheets

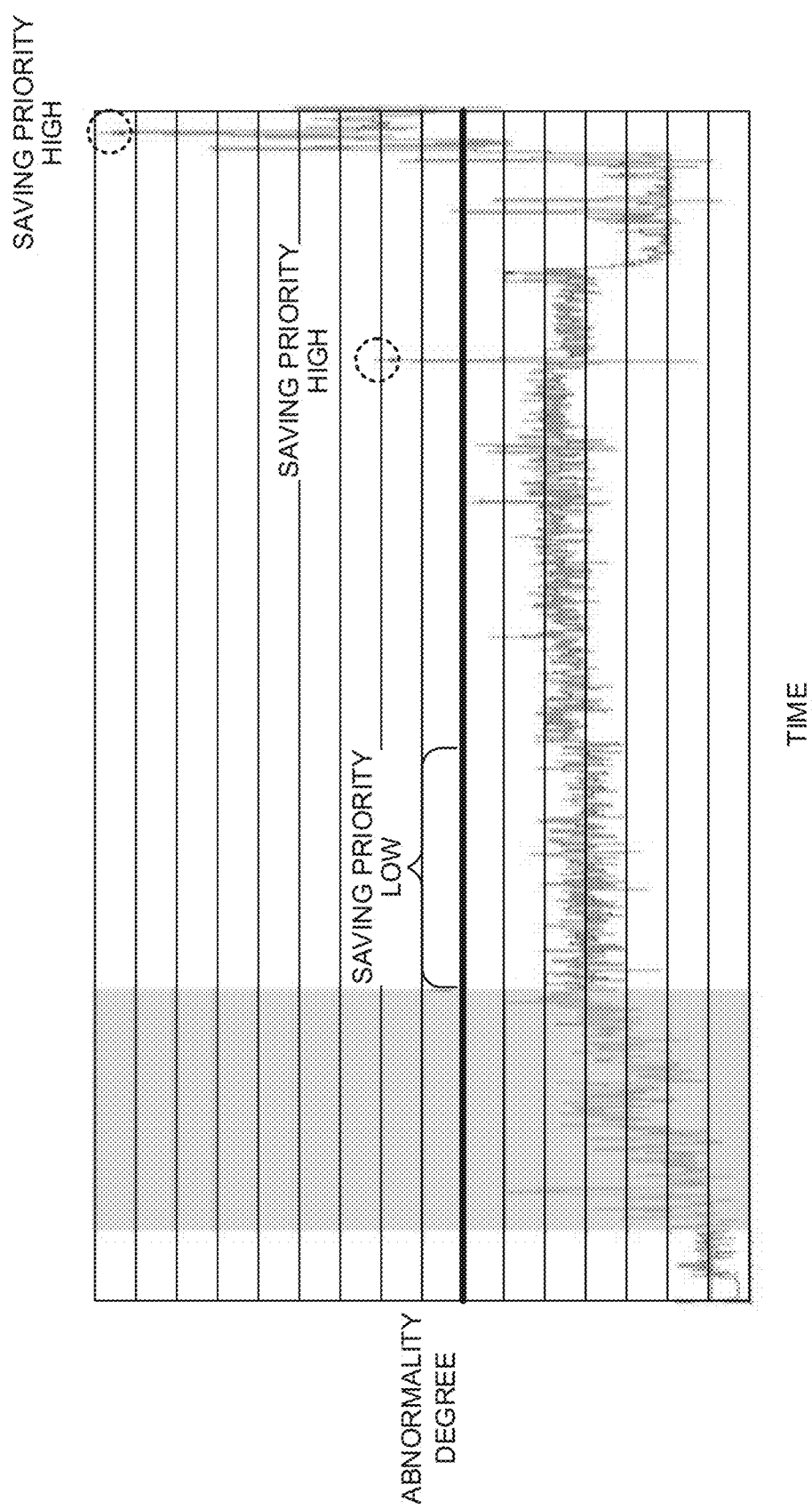

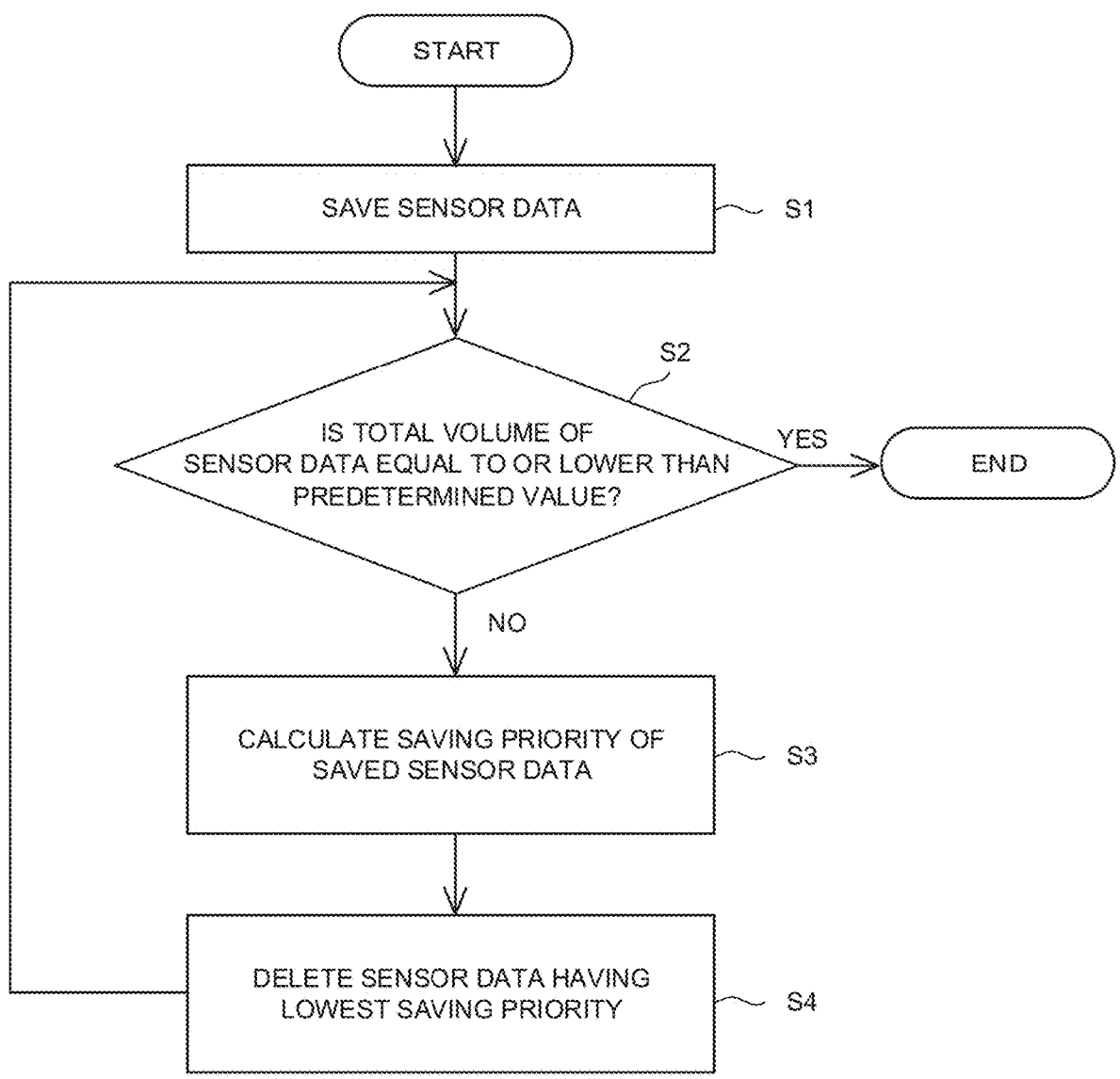

DATA MANAGEMENT DEVICE, DATA MANAGEMENT PROGRAM, AND DATA MANAGEMENT METHOD

RELATED APPLICATIONS

The present application claims priority to Japanese Patent Application Number 2018-137748 filed Jul. 23, 2018, the disclosure of which is hereby incorporated by reference herein in its entirety.

BACKGROUND OF THE INVENTION

1. Field of the Invention

The present invention relates to a data management device, a data management program, and a data management method and particularly relates to a data management device, a data management program, and a data management method for determining priority of sensor data to determine a saving method for the sensor data.

2. Description of the Related Art

Techniques of detecting abnormality of an industrial machine (to be referred to as machine, hereinbelow) such as a machine tool with use of sensor data from sensors installed in the machine have been broadly known. The sensor data acquired from the sensors may be used after being processed, instead of being directly used. There is a device that converts time-series values of the sensor data into an index expressing a degree of abnormality of the machine (to be referred to as abnormality degree, hereinbelow) and that displays the abnormality degree to a user (to be referred to as data management device, hereinbelow), for instance. The user makes a determination on necessity for replacement of components or the like based on the abnormality degree displayed by the data management device.

Then the user may refer to the sensor data that has formed a basis for calculation of the abnormality degree and may make the sensor data a reference for the determination. Accordingly, conventional data management devices do not delete but save the sensor data even after the abnormality degree is calculated. There is a problem, however, in that saving all pieces of the sensor data may cause an amount of the data to be enormous because the machine generally has a long life.

International Publication No. WO2016/199210 discloses a system that calculates an abnormality degree based on sensor data, that calculates an abnormality frequency and a remaining life based on the abnormality degree, and that determines the sensor data to be saved, based on the abnormality frequency the remaining life, and the like. Japanese Patent Application Laid-Open No. 2017-173321 discloses a system that calculates an abnormality degree based on sensor data and that thereafter erases the sensor data in accordance with such a reference as oldness of measurement time.

The technique disclosed in International Publication No. WO2016/199210, however, presupposes that the abnormality frequency and the remaining life can be calculated. For calculation of the abnormality frequency and the remaining life, knowledge on abnormalities and failures of equipment is required in advance. In the technique disclosed in Japanese Patent Application Laid-Open No. 2017-173321, there is no upper limit in amount of the saved sensor data, so that a storage area may run out. Even on condition that there is a sufficient free space in the storage area, the data may be unnecessarily thinned out.

The present invention has been produced in order to settle such problems. An object of the invention is to provide a data management device, a data management program, and a data management method for determining priority of sensor data to determine a saving method for the sensor data.

SUMMARY OF THE INVENTION

A data management device according to an embodiment of the invention is the data management device capable of calculating an evaluation index based on sensor data. The data management device includes: an evaluation index calculation unit that calculates the evaluation index with use of the sensor data acquired from one or more sensors installed in an industrial machine; a sensor data storage unit that saves the sensor data; and a sensor data deletion unit that deletes the sensor data from the sensor data storage unit when a total volume of the sensor data in the sensor data storage unit exceeds an upper limit. The data management device is characterized in that the sensor data deletion unit determines saving priority of the sensor data based on a degree of change in the evaluation index and deletes the sensor data in accordance with the saving priority.

The sensor data deletion unit of the data management device according to an embodiment of the invention is characterized by using variance in the evaluation index or a time-derivative of the evaluation index in a prescribed period, as the degree of change in the evaluation index.

The sensor data deletion unit of the data management device according to an embodiment of the invention is characterized by determining the saving priority of the sensor data based on the degree of change in the evaluation index and time having elapsed from acquisition time for the sensor data.

The sensor data deletion unit of the data management device according to an embodiment of the invention is characterized by determining the saving priority of the sensor data based on the degree of change in the evaluation index and a saving density of the sensor data.

The data management device according to an embodiment of the invention further includes a user interface unit that displays time-series data of the evaluation index, that receives a selection of the evaluation index at specific time, and that displays time-series data of the sensor data having formed a basis for calculation of the selected evaluation index. The data management device is characterized in that, in case where the sensor data having formed the basis for the calculation of the selected evaluation index has been deleted, the user interface unit displays another sensor data acquired at time proximate to acquisition time for the deleted sensor data.

The evaluation index calculated by the data management device according to an embodiment of the invention is characterized by being abnormality degree.

A data management program according to an embodiment of the invention is the data management program that causes a computer to execute a process of calculating an evaluation index based on sensor data. The data management program causes the computer to execute: a first step of calculating the evaluation index with use of the sensor data acquired from one or more sensors installed in an industrial machine; a second step of saving the sensor data in a sensor data storage unit; and a third step of deleting the sensor data from the sensor data storage unit when a total volume of the sensor data in the sensor data storage unit exceeds an upper limit. The data management program is characterized in that, in the third step, saving priority of the sensor data is determined based on a degree of change in the evaluation index and the sensor data is deleted in accordance with the saving priority.

A data management method according to an embodiment of the invention is the data management method of calculating an evaluation index based on sensor data. The data management method executes: a first step of calculating the evaluation index with use of the sensor data acquired from one or more sensors installed in an industrial machine; a second step of saving the sensor data in a sensor data storage unit; and a third step of deleting the sensor data from the sensor data storage unit when a total volume of the sensor data in the sensor data storage unit exceeds an upper limit. The data management method is characterized in that, in the third step, saving priority of the sensor data is determined based on a degree of change in the evaluation index and the sensor data is deleted in accordance with the saving priority.

According to the invention, the data management device, the data management program, and the data management method for determining the priority of the sensor data to determine a saving method for the sensor data can be provided.

BRIEF DESCRIPTION OF THE DRAWINGS

The above-mentioned and other objects and characteristics of the invention will become apparent from the following description of an embodiment with reference to the accompanying drawings, in which:

FIG. 5 is a diagram illustrating a relationship between a degree of change in the abnormality degree and saving priority; and FIG. 6 is a flowchart illustrating an example of operation of the data management device.

DETAILED DESCRIPTION OF THE PREFERRED EMBODIMENT

Figure 1:
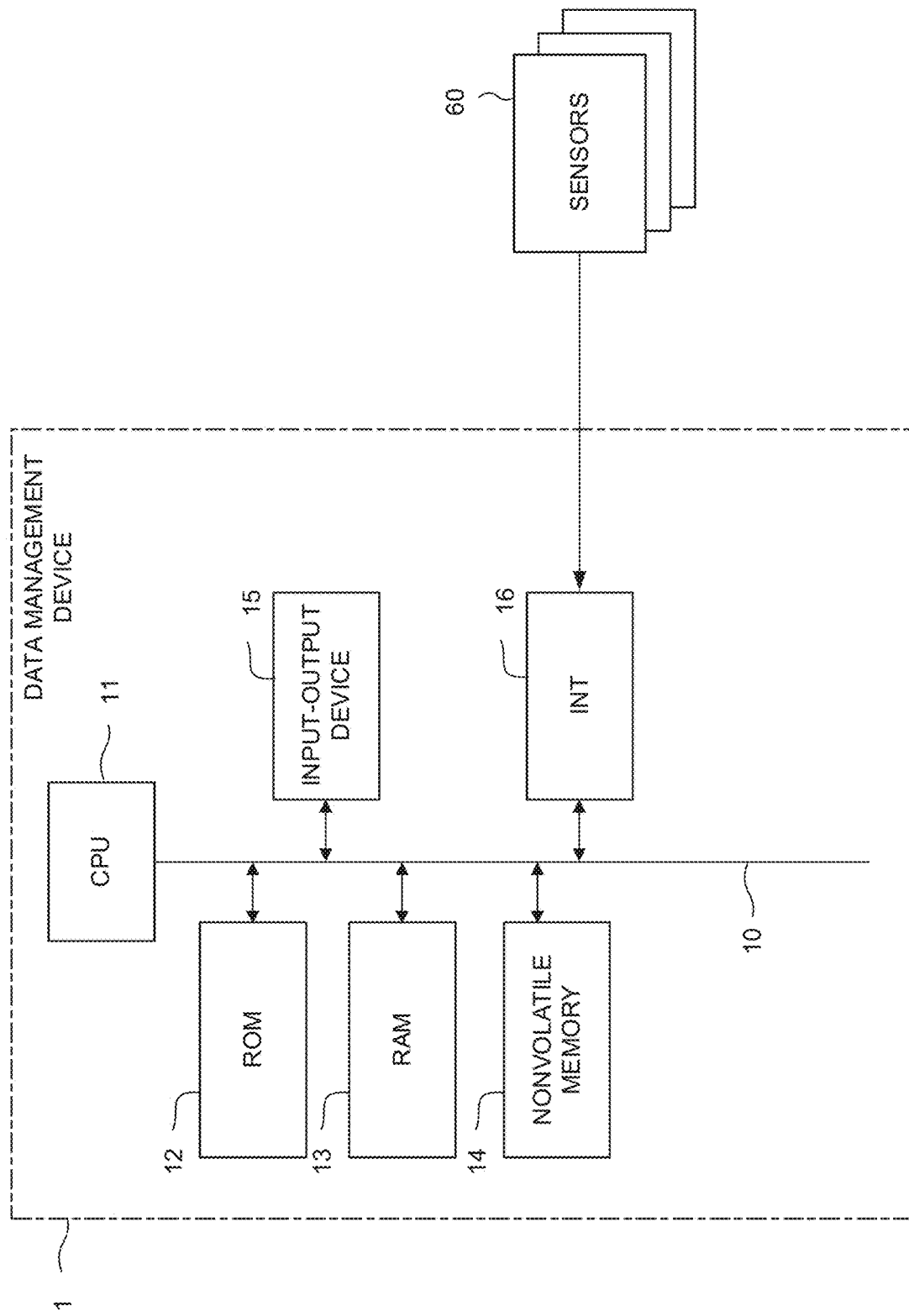
FIG. 1 is a diagram illustrating an example of a hardware configuration of a data management device.

FIG. 1 is a schematic hardware configuration illustrating a data management device 1. The data management device 1 is an information processing device that executes various processes with use of sensor data acquired from a machine. The data management device 1 is a personal computer (PC), a numerical controller, or the like, for instance. The data management device 1 includes a CPU 11, a ROM 12, a RAM 13, a nonvolatile memory 14, an input-output device 15, an interface 16, and a bus 10. One or more sensors 60 are connected to the data management device 1.

The CPU 11 is a processor that generally controls the data management device 1. The CPU 11 reads out system programs stored in the ROM 12 via the bus 10 and controls the entire data management device 1 in accordance with the system programs.

The ROM 12 stores the system programs in advance.

The RAM 13 temporarily stores temporary calculation data, display data, or data, programs, or the like that are inputted by an operator through the input-output device 15.

The nonvolatile memory 14 is backed up by a battery not illustrated, for instance, and retains storage status even when the data management device 1 is powered off. The nonvolatile memory 14 stores data, programs, or the like that is inputted from the input-output device 15, for instance. The programs and the data that are stored in the nonvolatile memory 14 may be loaded in the RAM 13 when executed and when used.

The input-output device 15 is a data input-output device that includes a display device such as a display and an input device such as a keyboard. The input-output device 15 displays information, received from the CPU 11, on the display, for instance. The input-output device 15 passes data, inputted from the keyboard, to the CPU 11.

The sensors 60 are such sensors installed at various sites in the machine, as temperature sensors, velocity sensors, or acceleration sensors. The one or more sensors 60 are connected to the interface 16 by wired or wireless communication means. The sensor data outputted by the sensors 60 is passed through the interface 16 to the CPU 11.

Figure 2:
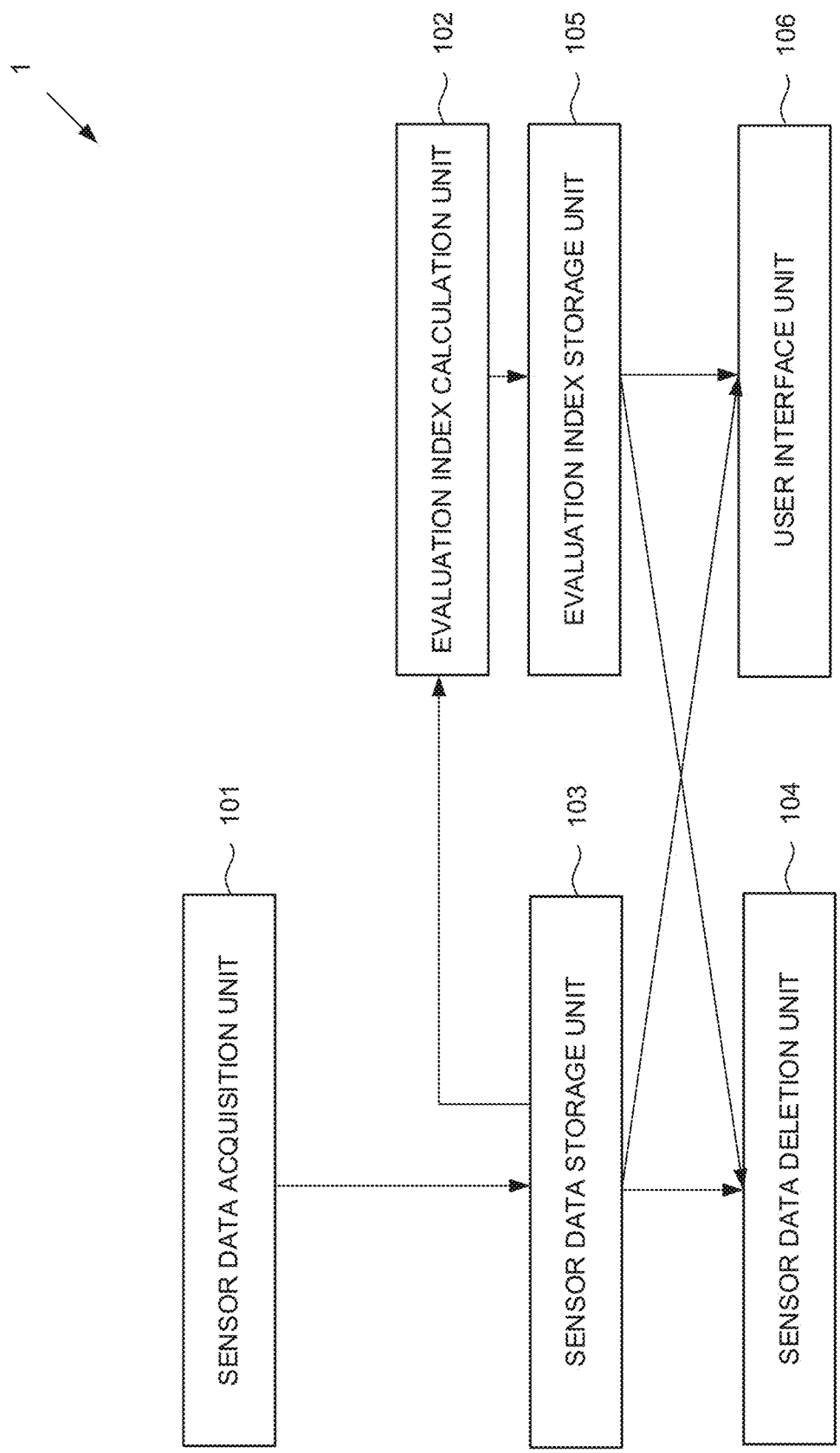
FIG. 2 is a diagram illustrating an example of a functional configuration of the data management device.

FIG. 2 is a block diagram illustrating a schematic functional configuration of the data management device 1. The data management device 1 includes a sensor data acquisition unit 101, an evaluation index calculation unit 102, a sensor data storage unit 103, a sensor data deletion unit 104, an evaluation index storage unit 105, and a user interface unit 106.

The sensor data acquisition unit 101 acquires the sensor data by communicating with the one or more sensors 60, installed in the machine, at regular intervals, for instance. The sensor data acquisition unit 101 sequentially accumulates the acquired sensor data in the sensor data storage unit 103. That is, the sensor data acquisition unit 101 forms time-series sensor data in the sensor data storage unit 103.

The evaluation index calculation unit 102 calculates an evaluation index with use of the sensor data accumulated in the sensor data storage unit 103. The evaluation index is abnormality degree, for instance. The abnormality degree is an index that is calculated based on the time-series sensor data and that expresses a degree of an abnormality of the machine. Though there are a large number of types of the abnormality degree, description on methods of calculating of the abnormality degree of such various types is omitted herein because the methods are publicly known. The evaluation index calculation unit 102 calculates one piece of abnormality degree data with use of a plurality pieces of the sensor data in a given period (normally, time-series data with an amount on the order of several kilobytes), for instance. That is, the evaluation index calculation unit 102 generates time-series abnormality degree data having a smaller data size, based on the time-series sensor data.

The sensor data storage unit 103 stores the time-series sensor data, acquired by the sensor data acquisition unit 101, in a specified storage area.

When a total volume of the sensor data saved in the sensor data storage unit 103 exceeds a predetermined upper limit, the sensor data deletion unit 104 deletes the sensor data in ascending order of saving priority that is determined by a technique to be described subsequently, until the total volume is made equal to or smaller than the upper limit. That is, the sensor data deletion unit 104 of the embodiment saves the acquired sensor data without modification unless necessity for deletion arises.

The sensor data deletion unit 104 determines the saving priority of the sensor data, based on at least one of a degree of change in the evaluation index (such as the abnormality degree) calculated by the evaluation index calculation unit 102, saving density of the sensor data, and time having elapsed from acquisition time of the sensor data. Herein, the degree of change in the evaluation index refers to degree in which the evaluation index changes. The saving density of the sensor data refers to a number of the sensor data that is saved per unit time. A relationship thereamong is represented as expression (1).

$$Pr(x)=f(\text{den}(x),\text{dif}(x),\text{Ela}(x)) \qquad (1)$$

Pr(x) is the saving priority of the sensor data acquired at a measurement point (that is, measurement time) x. den(x) is the saving density of the sensor data in a vicinity of the measurement point x (number of the data saved in ±12 hours, for instance). dif(x) is the degree of change in the evaluation index in the vicinity of the measurement point x (variance in the abnormality degree or a time-derivative of the abnormality degree in ±12 hours, for instance). Ela(x) is the time having elapsed from the measurement point x up to the present.

Usually, it is not the sensor data but the evaluation index having high visibility (such as a graph indicating temporal transition of the abnormality degree) that the user refers to for determination of presence or absence of abnormality in the machine. The user, however, may refer to the sensor data that has formed a basis for calculation of the evaluation index, as appropriate. Conventionally, an enormous amount of the storage area has been used for storage of all pieces of the sensor data, for instance. In this respect, the inventor has found out that, as for the evaluation index that is of high importance (that attracts interest of users), a great number of users have a strong tendency to refer to the sensor data that has formed the basis for the calculation of the evaluation index. The evaluation index that is of high importance (that attracts the interest of users) refers to an evaluation index in a vicinity of time when the evaluation index sharply fluctuates, that is, when the evaluation index exhibits a great degree of change, for instance. Based on this knowledge, at sites where the abnormality degree exhibits the great degree of change, the sensor data deletion unit 104 of the embodiment raises the saving priority of the sensor data so as to make the sensor data resist being deleted. At sites where the abnormality degree exhibits a small degree of change, the sensor data deletion unit 104 lowers the saving priority of the sensor data so as to make the sensor data prone to be deleted (see FIG. 5). Thus it is made possible to preferentially delete the sensor data that has small chance to be referred to by the user.

Meanwhile, in case where all pieces of the sensor data is deleted at the sites where the abnormality degree exhibits the small degree of change, it is made impossible to make reference to the sensor data when necessity for the reference arises, though the sensor data has the small chance to be referred to by the user. As for at least some pieces of abnormality degree data among abnormality degree data in periods when the abnormality degree exhibits the small degree of change, it is desirable to save the sensor data that has formed a basis for calculation of the abnormality degree data. The smaller the saving density of the sensor data (the number of the data saved) in the vicinity of the measurement point is, the higher the sensor data deletion unit 104 of the embodiment raises the saving priority of the sensor data so as to make the sensor data resist being deleted, based on this knowledge. Thus an appropriate thinning rate for the sensor data at the sites where the abnormality degree exhibits the small degree of change may be maintained, so that the necessary sensor data may be referred to.

Furthermore, the inventor has found out that there is a tendency for newer evaluation index to increase a frequency of the reference to the sensor data and for older evaluation index to decrease the frequency of the reference to the sensor data. The longer the time having elapsed from the measurement point for the sensor data up to the present is, the lower the sensor data deletion unit 104 of the embodiment makes the saving priority of the sensor data so as to make the sensor data prone to be deleted, based on this knowledge. Thus it is made possible to preferentially delete the sensor data that has the small chance to be referred to by the user.

An example of a determining formula for the saving priority of the sensor data that reflects above knowledge is presented as expression (2).

$$Pr(x) = f(den(x), dif(x), Ela(x)) = \frac{dif(x)}{Ela(x) \times (den(x) - 1)} \qquad (2)$$

According to expression (2), the saving priority of the sensor data acquired at the measurement point x is proportional to the degree of change in the abnormality degree, inversely proportional to the time having elapsed, and inversely proportional to the saving density. As for the saving density, a configuration is made such that the number of the data saved in ±12 hours being 1 may make the priority infinite, for instance.

The evaluation index storage unit 105 stores the time-series abnormality degree data calculated by the evaluation index calculation unit 102 in a specified storage area.

The user interface unit 106 presents the evaluation index and the sensor data to the user by displaying the evaluation index and the sensor data on the display or the like. The user interface unit 106 provides means for instructing the data management device 1 to display the sensor data that has formed a basis for calculation of a specific evaluation index.

Figure 3:
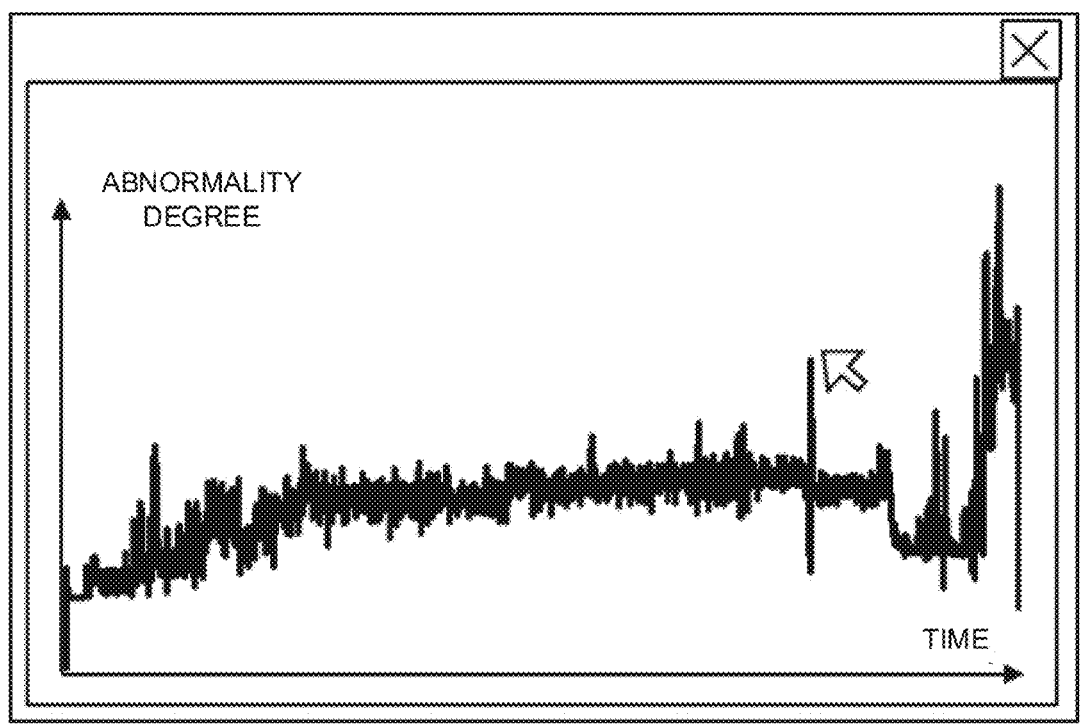
FIG. 3 is a diagram illustrating a display example of abnormality degrees.
Figure 4:
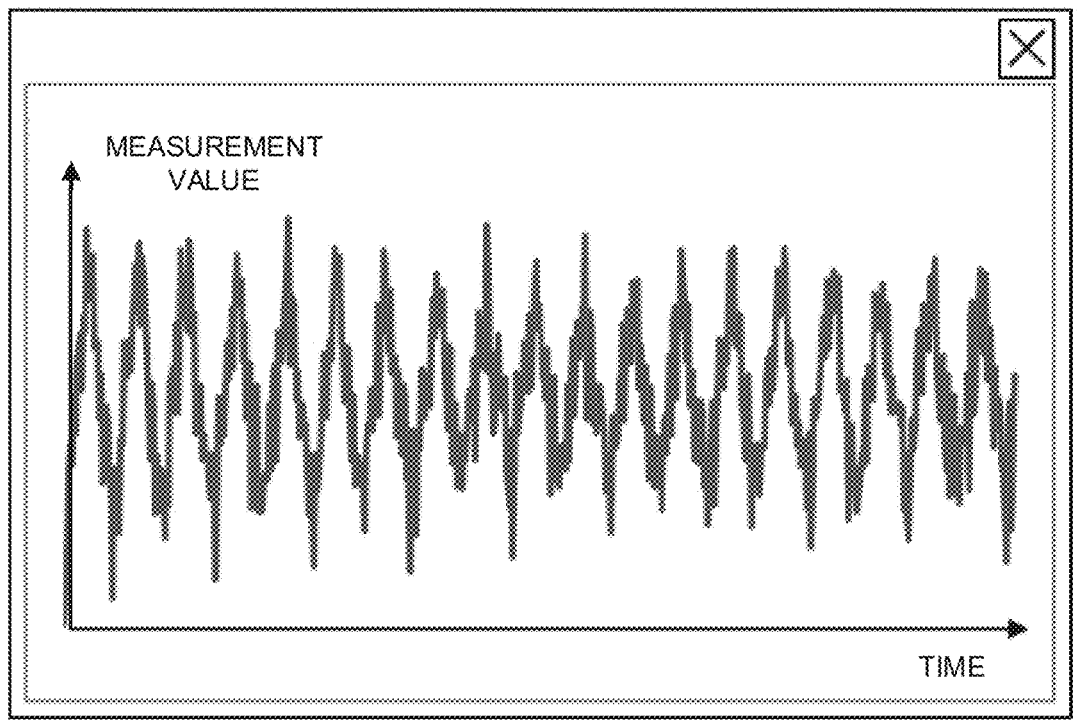
FIG. 4 is a diagram illustrating a display example of sensor data.

FIGS. 3 and 4 are each an example of a screen displayed by the user interface unit 106. FIG. 3 is a screen on which a graph having the time-series abnormality degree data plotted thereon is displayed. Vertical axis of the graph represents the abnormality degree and horizontal axis of the graph represents time. When the user points at an arbitrary point on the graph, the user interface unit 106 identifies abnormality degree data (or time) corresponding to the point that is pointed at. The user interface unit 106 refers to the sensor data storage unit 103 and tries to acquire the sensor data corresponding to the identified abnormality degree data (or time). In case where the corresponding sensor data exists, the user interface unit 106 acquires the sensor data and displays the screen illustrated in FIG. 4. FIG. 4 illustrates a screen on which a graph having the time-series sensor data plotted thereon is displayed. Vertical axis of the graph represents the sensor data and horizontal axis of the graph represents time. In case where the corresponding sensor data does not exist, by contrast, the user interface unit 106 iteratively tries to acquire the sensor data corresponding to another abnormality degree data (or time) in a vicinity of the point that is pointed at, until succeeding in acquiring the sensor data. The user interface unit 106 displays the acquired sensor data on the screen of FIG. 4.

With use of a flowchart of FIG. 6, operation of the data management device 1 according to the embodiment will be described.

S1: The sensor data acquisition unit 101 acquires the sensor data from the one or more sensors 60 and accumulates the sensor data in the sensor data storage unit 103.

At arbitrary timing after that, the evaluation index calculation unit 102 calculates the evaluation index, that is, the abnormality degree with use of the time-series sensor data accumulated in the sensor data storage unit 103.

S2: The sensor data deletion unit 104 monitors the total volume of the sensor data saved in the sensor data storage unit 103. In case where the total volume exceeds the predetermined upper limit, processing makes a transition to step S3. In case where the total volume is equal to or lower than the upper limit, the processing ends.

S3: The sensor data deletion unit 104 determines the saving priority of the sensor data, based on at least one of the degree of change in the evaluation index, that is, the abnormality degree calculated by the evaluation index calculation unit 102, the saving density of the sensor data, and the time having elapsed from the acquisition time for the sensor data.

S4: The sensor data deletion unit 104 deletes the sensor data having the lowest saving priority.

According to the embodiment, the saving priority of the sensor data is determined based on at least one of the degree of change in the evaluation index, that is, the abnormality degree, the saving density of the sensor data, and the time having elapsed from the acquisition time for the sensor data. When excess of the total volume of the sensor data over the predetermined upper limit causes the necessity for the deletion, the sensor data having low saving priority is deleted. Thus unnecessary deletion of the sensor data, in other words, unnecessary thinning may be prevented. Additionally, it can be ensured that a size of the sensor data is equal to or lower than the predetermined upper limit.

According to the embodiment, furthermore, the sensor data to be saved is determined based on only the acquired sensor data and the abnormality degree and thus no prior knowledge on abnormalities and failures of equipment is required. In addition, a determination of feasibility of the deletion is made after saving of the sensor data to a certain degree and thus statistics such as the variance in the abnormality degree may be used for the determination of the feasibility of the deletion of the sensor data, for instance.

Though the embodiment of the invention has been described above, the invention is not limited only to the example of the embodiment that has been described above and may be embodied in various manners with appropriate modifications. In the embodiment described above, for instance, the sensor data deletion unit 104 makes a determination of the feasibility of the deletion of all pieces of the sensor data saved in saved in the sensor data storage unit 103. The sensor data in a period of exclusion that has been specified in advance, however, may be configured to be excluded from objects of the determination (that is, so as not to be deleted), for instance. For instance, the user may specify a period when it seems desirable to permanently save the sensor data without thinning the sensor data, such as date and time when a change in external environment occurs, as the period of exclusion. When detecting a predetermined event, the data management device 1 may specify a predetermined period, associated with time of occurrence of the event, as the period of exclusion.

In the embodiment described above, an example has been presented in which the saving density and the saving priority are made inversely proportional to each other so that the sensor data deletion unit 104 may not excessively thin out the sensor data. The invention, however, is not limited to the example and constraints such as provision of lower limit of the number or volume of the sensor data saved in a given period may be further added thereto, for instance.

Though the example in which the user interface unit 106 displays the graphs of the evaluation index and the sensor data has been presented in the embodiment described above, the invention is not limited to the example. The user interface unit 106 may display the evaluation index and the sensor data in an arbitrary format such as numerical values, a table, or the like.

Though an example in which the evaluation index calculation unit 102 calculates the abnormality degree as the evaluation index has been chiefly described in the embodiment described above, the invention is not limited to the example. The evaluation index calculation unit 102 may calculate an arbitrary evaluation index while using the sensor data. The sensor data deletion unit 104 may determine whether the deletion of the sensor data is to be executed or not, based on the arbitrary evaluation index.

The invention claimed is:

1. A data management device, comprising:
a processor configured to calculate an evaluation index indicating a degree of abnormality of an industrial machine based on sensor data acquired from one or more sensors installed in the industrial machine; and
a memory configured to save
the evaluation index indicating the degree of abnormality of the industrial machine calculated based on the sensor data, and
the sensor data acquired from the one or more sensors, wherein
the processor is configured to
determine saving priority of the sensor data based on (i) a degree of change in the evaluation index indicating the degree of abnormality of the industrial machine and (ii) a saving density of the sensor data, the saving density defined by the number of the sensor data saved in the memory,
in response to a total volume of the sensor data in the memory exceeding an upper limit, delete the sensor data from the memory in accordance with the saving priority, and
in response to the saving density of the sensor data decreasing, raise the saving priority of the sensor data.

2. The data management device according to claim 1, wherein
the processor is configured to determine variance in the evaluation index or a time-derivative of the evaluation index in a predetermined period, as the degree of change in the evaluation index.

3. The data management device according to claim 1, wherein
the processor is configured to determine the saving priority of the sensor data based on the degree of change in the evaluation index and time having elapsed from acquisition time for the sensor data.

4. The data management device according to claim 1, wherein
the processor is configured to
cause a display to display time-series data of the evaluation index,
receive a selection of the evaluation index at specific time,
display time-series data of the sensor data having formed a basis for calculation of the selected evaluation index, and in response to the sensor data having formed the basis for the calculation of the selected evaluation index being deleted, display another sensor data acquired at a time proximate to an acquisition time of the deleted sensor data.

5. A non-transitory storage medium storing a data management program configured to cause a computer to execute:
calculating an evaluation index indicating a degree of abnormality of an industrial machine based on sensor data acquired from one or more sensors installed in the industrial machine;
saving the evaluation index indicating the degree of abnormality of the industrial machine calculated based on the sensor data and the sensor data acquired from the one or more sensors, in a memory;
determining saving priority of the sensor data based on (i) a degree of change in the evaluation index indicating the degree of abnormality of the industrial machine and (ii) a saving density of the sensor data, the saving density defined by the number of the sensor data saved in the memory;
deleting the sensor data from the memory in accordance with the saving priority, in response to a total volume of the sensor data in the memory exceeding an upper limit; and
raising the saving priority of the sensor data in response to the saving density of the sensor data decreasing.

6. A data management method, comprising:
calculating an evaluation index indicating a degree of abnormality of an industrial machine based on sensor data acquired from one or more sensors installed in the industrial machine;
saving the evaluation index indicating the degree of abnormality of the industrial machine calculated based on the sensor data and the sensor data acquired from the one or more sensors, in a memory;
determining saving priority of the sensor data based on (i) a degree of change in the evaluation index indicating the degree of abnormality of the industrial machine and (ii) a saving density of the sensor data, the saving density defined by the number of the sensor data saved in the memory;
deleting the sensor data from the memory in response to a total volume of the sensor data in the memory exceeding an upper limit; and
raising the saving priority of the sensor data in response to the saving density of the sensor data decreasing.

* * * * *